United States Patent
Jacobsen et al.

(10) Patent No.: US 7,869,192 B2
(45) Date of Patent: Jan. 11, 2011

(54) ADJUSTABLE ELECTRICAL SWITCHING APPARATUS MOUNTING APPARATUS AND SWITCHGEAR APPARATUS INCLUDING THE SAME

(75) Inventors: Mark W. Jacobsen, Spartanburg, SC (US); Jaymie L. Davenport, Hodges, SC (US); Barry T. Rambo, Bradley, SC (US)

(73) Assignee: Eaton Corporation, Cleveland, OH (US)

( * ) Notice: Subject to any disclaimer, the term of this patent is extended or adjusted under 35 U.S.C. 154(b) by 63 days.

(21) Appl. No.: 12/466,969

(22) Filed: May 15, 2009

(65) Prior Publication Data

US 2010/0290175 A1    Nov. 18, 2010

(51) Int. Cl.
*H02B 1/26* (2006.01)
*B02B 1/04* (2006.01)
(52) U.S. Cl. .................. 361/605; 361/627; 361/631; 361/634; 361/643; 361/647; 361/652; 361/673; 248/220.21; 248/222.11; 248/27.1; 200/293; 200/294; 200/400; 200/50.11; 200/50.01; 439/119; 439/267; 439/275; 439/651
(58) Field of Classification Search ................. 361/600, 361/601, 605, 622, 627, 631, 634, 641, 643, 361/647, 652, 673, 636, 658, 832; 248/222.11, 248/224.8, 220.21, 27.1, 225.11; 200/50.01, 200/50.11, 50.27, 400, 50.24; 439/212, 718, 439/119, 267, 275, 651, 114, 207, 209, 215, 439/460, 571–575, 716; 174/66, 67, 148, 174/70 B, 71 B, 149 B; 29/557, 558, 401.1, 29/434, 402.08
See application file for complete search history.

(56) References Cited

U.S. PATENT DOCUMENTS

| | | | | |
|---|---|---|---|---|
| 3,382,416 A * | 5/1968 | Jacobs et al. | ................. | 361/645 |
| 4,832,626 A * | 5/1989 | Wagener | ..................... | 439/715 |
| 4,874,321 A * | 10/1989 | Wagener et al. | ............. | 439/119 |
| 5,321,381 A * | 6/1994 | Essig | ......................... | 337/398 |
| 5,341,191 A | 8/1994 | Crookston et al. | | |
| 6,292,076 B1 * | 9/2001 | DeGrazia et al. | ............ | 335/202 |
| 6,951,990 B1 * | 10/2005 | Miller | ..................... | 200/50.21 |
| 7,124,488 B2 * | 10/2006 | Ford et al. | ................. | 29/401.1 |
| 7,209,343 B2 * | 4/2007 | Remmert et al. | ............. | 361/634 |
| 7,286,340 B2 * | 10/2007 | Karim et al. | ................ | 361/647 |
| 7,485,817 B2 * | 2/2009 | Gottschalk | ............... | 200/50.21 |
| 7,486,499 B2 * | 2/2009 | Rambo et al. | ............... | 361/609 |
| 7,695,313 B2 * | 4/2010 | Karim et al. | ............. | 439/540.1 |
| 7,713,072 B2 * | 5/2010 | Azzola et al. | ................ | 439/119 |

\* cited by examiner

*Primary Examiner*—Michael V Datskovskiy
(74) *Attorney, Agent, or Firm*—Martin J. Moran (57) ABSTRACT

An electrical switching apparatus mounting apparatus includes a base with a planar portion having a first side and an opposite second side. A number of first adjustable members are coupled to the opposite second side. Each of the first adjustable members includes a first end and an opposite second end. A number of second adjustable members are coupled transverse to the first adjustable members and include a first end and an opposite second end. At least one of the first end and the opposite second end of at least one of the first adjustable members and the second adjustable members is adjustable generally toward or generally away from the base. At least one of the first end and the opposite second end of the at least one of the first adjustable members and the second adjustable members is coupled to a number of walls of a switchgear enclosure.

22 Claims, 7 Drawing Sheets

ADJUSTABLE ELECTRICAL SWITCHING APPARATUS MOUNTING APPARATUS AND SWITCHGEAR APPARATUS INCLUDING THE SAME

BACKGROUND

1. Field

The disclosed concept pertains generally to electrical switching apparatus and, more particularly, to mounting apparatus for electrical switching apparatus. The disclosed concept also pertains to switchgear apparatus for mounting electrical switching apparatus.

2. Background Information

Modernization of existing switchgear structures frequently involves the replacement of older electrical switching apparatus including, for example and without limitation, circuit switching devices, and circuit interrupters, such as circuit breakers and network protectors, with new devices. Frequently, such new devices employ relatively more modern technologies. An example of this is the replacement of medium voltage air circuit breakers with vacuum bottle based circuit breakers.

Such new devices may be of the fixed mount or withdrawable type but, in either case, there exists a stationary component (e.g., the cradle or cassette in the case of the withdrawable type) that needs to be properly interconnected with remaining switchgear cell components, most notably the primary bus system. In addition, the mounting mechanism must be adequately braced to resist the electromagnetic forces resulting from relatively very high fault currents the application may experience.

No known electrical switching apparatus mounting apparatus adjusts in any direction in order to provide a different position of an electrical switching apparatus.

There is room for improvement in mounting apparatus for electrical switching apparatus.

There is also room for improvement in switchgear apparatus in which an electrical switching apparatus is mounted.

SUMMARY

These needs and others are met by embodiments of the disclosed concept, which provide an electrical switching apparatus mounting apparatus that is adjustable in one or more different directions.

For example, a frequent difficulty with the above-discussed modernization process is in providing a mechanism to easily interface, for example, the existing primary bus system to the new device while providing the necessary strength. Where a wide variety of applications are desired to be supported with minimum engineering and customization, it is desirable to provide a mechanism of, for example, easily varying the mounting location of the electrical switching apparatus, in all three axes, and then in easily securing the mount to the enclosure to provide a rigid platform.

In accordance with one aspect of the disclosed concept, an electrical switching apparatus mounting apparatus comprises: a base including a planar portion having a first side and an opposite second side; a number of first adjustable members coupled to the opposite second side of the base, each of the number of first adjustable members including a first end and an opposite second end; and a number of second adjustable members coupled transverse to the number of first adjustable members, each of the number of second adjustable members including a first end and an opposite second end, wherein at least one of the first end and the opposite second end of at least one of the number of first adjustable members and the number of second adjustable members is structured to be adjustable generally toward or generally away from the base, and wherein at least one of the first end and the opposite second end of the at least one of the number of first adjustable members and the number of second adjustable members is structured to be coupled to a number of walls of a switchgear enclosure.

Both of the first end and the opposite second end of the number of first adjustable members may be structured to be adjustable toward or away from the base, and may be structured to be coupled to two walls of the number of walls of the switchgear enclosure.

Both of the first end and the opposite second end of the number of second adjustable members may be structured to be adjustable generally toward or generally away from the base, and may be structured to be coupled to two walls of the number of walls of the switchgear enclosure.

A plurality of elongated members may be coupled transverse to the number of first adjustable members and may be disposed transverse to the number of second adjustable members, each of the plurality of elongated members may include a first end and an opposite second end; for each of the plurality of elongated members, a corresponding adjustment member may couple a corresponding one of the plurality of elongated members to a corresponding one of the number of first adjustable members distal from the opposite second end of the corresponding one of the plurality of elongated members; for each of the plurality of elongated members, a corresponding coupling mechanism may be coupled to the opposite second end of the corresponding one of the plurality of elongated members, the corresponding coupling mechanism may be structured to couple the electrical switching apparatus mounting apparatus to a wall of the number of walls of the switchgear enclosure; and the corresponding adjustment member may be structured to adjust the distance between the corresponding coupling mechanism and a corresponding one of the number of first adjustable members.

The corresponding coupling mechanism may be coupled to the opposite second end of the corresponding one of the plurality of elongated members; and the corresponding coupling mechanism may comprise a number of fasteners structured to couple the opposite second end of the corresponding one of the plurality of elongated members to the wall of the number of walls of the switchgear enclosure.

The at least one of the first end and the opposite second end of the at least one of the number of first adjustable members and the number of second adjustable members may be structured to be fastened to the wall of the number of walls of the switchgear enclosure.

As another aspect of the disclosed concept, a switchgear apparatus comprises: an enclosure comprising a plurality of walls; an electrical switching apparatus disposed in the enclosure; and an electrical switching apparatus mounting apparatus disposed in the enclosure, the electrical switching apparatus mounting apparatus comprising: a base including a planar portion having a first side and an opposite second side, the electrical switching apparatus being mounted to the first side of the base, a number of first adjustable members coupled to the opposite second side of the base, each of the number of first adjustable members including a first end and an opposite second end, and a number of second adjustable members coupled transverse to the number of first adjustable members, each of the number of second adjustable members including a first end and an opposite second end, wherein at least one of the first end and the opposite second end of at least one of the number of first adjustable members and the number of second adjustable members is structured to be adjustable generally toward or generally away from the base, and wherein at least one of the first end and the opposite second end of the at least one of the number of first adjustable members and the number of second adjustable members is coupled to a number of the plurality of walls of the enclosure.

The number of the plurality of walls of the enclosure may be two walls of the plurality of walls of the enclosure; and both of the first end and the opposite second end of the number of first adjustable members may be adjustable toward or away from the base, and may be coupled to the two walls of the plurality of walls of the enclosure.

A plurality of elongated members may be coupled transverse to the number of first adjustable members and may be disposed transverse to the number of second adjustable members, each of the plurality of elongated members may include a first end and an opposite second end; for each of the plurality of elongated members, a corresponding adjustment member may couple a corresponding one of the plurality of elongated members to a corresponding one of the number of first adjustable members distal from the opposite second end of the corresponding one of the plurality of elongated members; for each of the plurality of elongated members, a corresponding coupling mechanism may be coupled to the opposite second end of the corresponding one of the plurality of elongated members, the corresponding coupling mechanism may couple the electrical switching apparatus mounting apparatus to one wall of the number of the plurality of walls of the enclosure; and the corresponding adjustment member may adjust the distance between the corresponding coupling mechanism and a corresponding one of the number of first adjustable members.

The number of the plurality of walls of the enclosure may be four walls of the plurality of walls of the enclosure; the electrical switching apparatus may be positioned on the first side of the base of the electrical switching apparatus mounting apparatus; both of the first end and the opposite second end of the number of first adjustable members may be adjustable toward or away from the base, and may be coupled to two opposing walls of the four walls; and both of the first end and the opposite second end of the number of second adjustable members may be adjustable generally toward or generally away from the base, and may be coupled to two different opposing walls of the four walls.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "wall" shall mean a wall or side (e.g., without limitation, a front side, a rear side, a left side, a right side, a top side, a bottom side, a front wall, a rear wall, a left wall, a right wall, a top wall, a bottom wall) of a switchgear enclosure.

As employed herein, the term "generally toward" shall mean the same as the term "toward", in the direction of another object, or in the general direction of another object. For example and without limitation, when an adjustable member is adjustable generally toward a base, it is adjustable toward the base, in the direction of the base, or in the general direction of the base, such that the adjustable member is adjustable closer to the base.

As employed herein, the term "generally away from" shall mean the same as "away from", in the direction away from another object, or in the general direction away from another object. The term "generally away from" means the opposite of "generally toward". For example and without limitation, when an adjustable member is adjustable generally away from a base, it is adjustable away from the base, in the direction away from the base, or in the general direction away from the base, such that the adjustable member is adjustable farther from the base.

As employed herein, the term "fastener" refers to any suitable connecting or tightening mechanism expressly including, but not limited to, screws, bolts (e.g., without limitation, carriage bolts) and the combinations of bolts and nuts (e.g., without limitation, lock nuts and wing nuts) and bolts, washers and nuts.

As employed herein, the statement that two or more parts are "coupled" together shall mean that the parts are joined together either directly or joined through one or more intermediate parts.

Directional phrases used herein, such as, for example, top, bottom, front, back, left, right, upper, lower and derivatives thereof, relate to the orientation of the elements shown in the drawings and are not limiting upon the claims unless expressly recited therein.

The disclosed concept is described in association with a mounting apparatus for an electrical switching apparatus, such as a single circuit interrupter, although the disclosed concept is applicable to a wide range of any suitable number of electrical switching apparatus.

Figure 5:
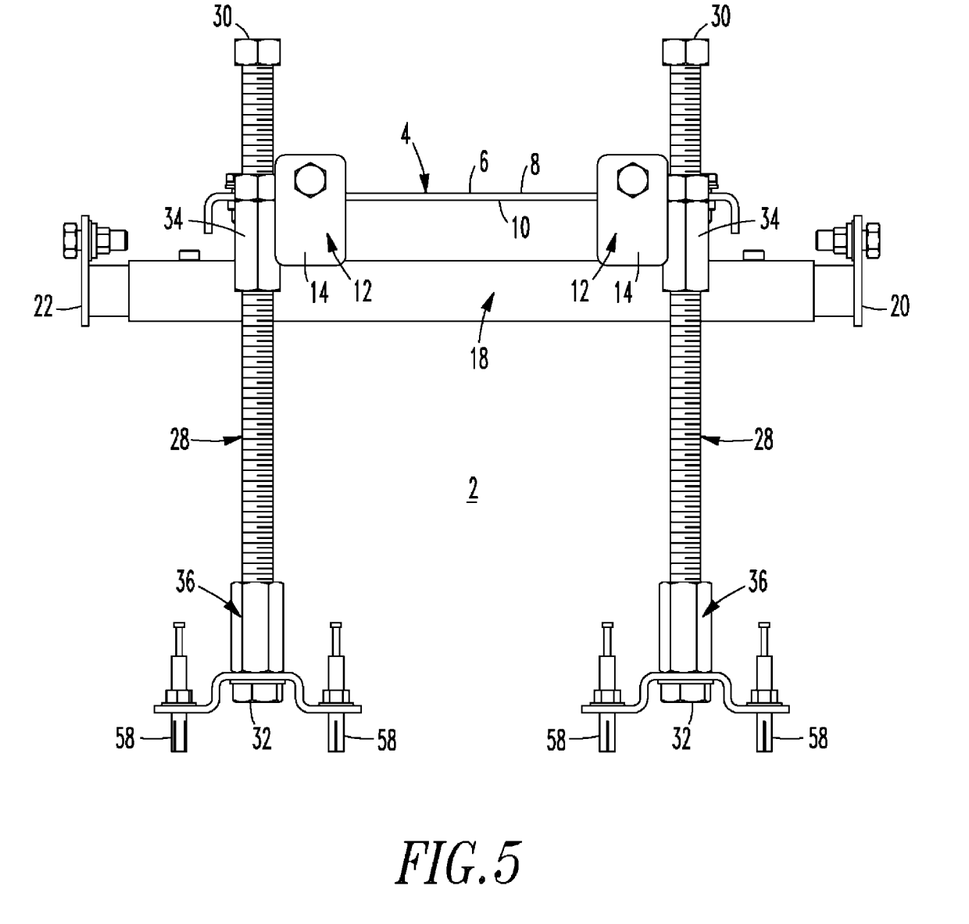
FIG. 5 is an end elevation view of the electrical switching apparatus mounting apparatus of FIG. 1.

Referring to FIGS. 1-5, an electrical switching apparatus mounting apparatus 2 is shown. The mounting apparatus 2 includes a base 4 with a planar portion 6 having a first side 8 (FIG. 5) and an opposite second side 10 (FIG. 5). A number of first adjustable members 12 (two example first adjustable members 12 are shown) are coupled to the opposite second side 10 of the base 4. Each of the first adjustable members 12 includes a first end 14 and an opposite second end 16. A number of second adjustable members 18 (two example second adjustable members 18 are shown) are coupled transverse to the first adjustable members 12. Each of the second adjustable members 18 includes a first end 20 and an opposite second end 22. At least one of the first end 14,20 and the opposite second end 16,22 of at least one of the first and second adjustable members 12,18 is structured to be adjustable generally toward or generally away from the base 4, as will be explained. At least one of the first end 14,20 and the opposite second end 16,22 of the at least one of the first and second adjustable members 12,18 is structured to be coupled to a number of walls 24 (FIGS. 6 and 7) of a switchgear enclosure 26 (FIGS. 6 and 7), as will be explained.

Example 1

Figure 6:
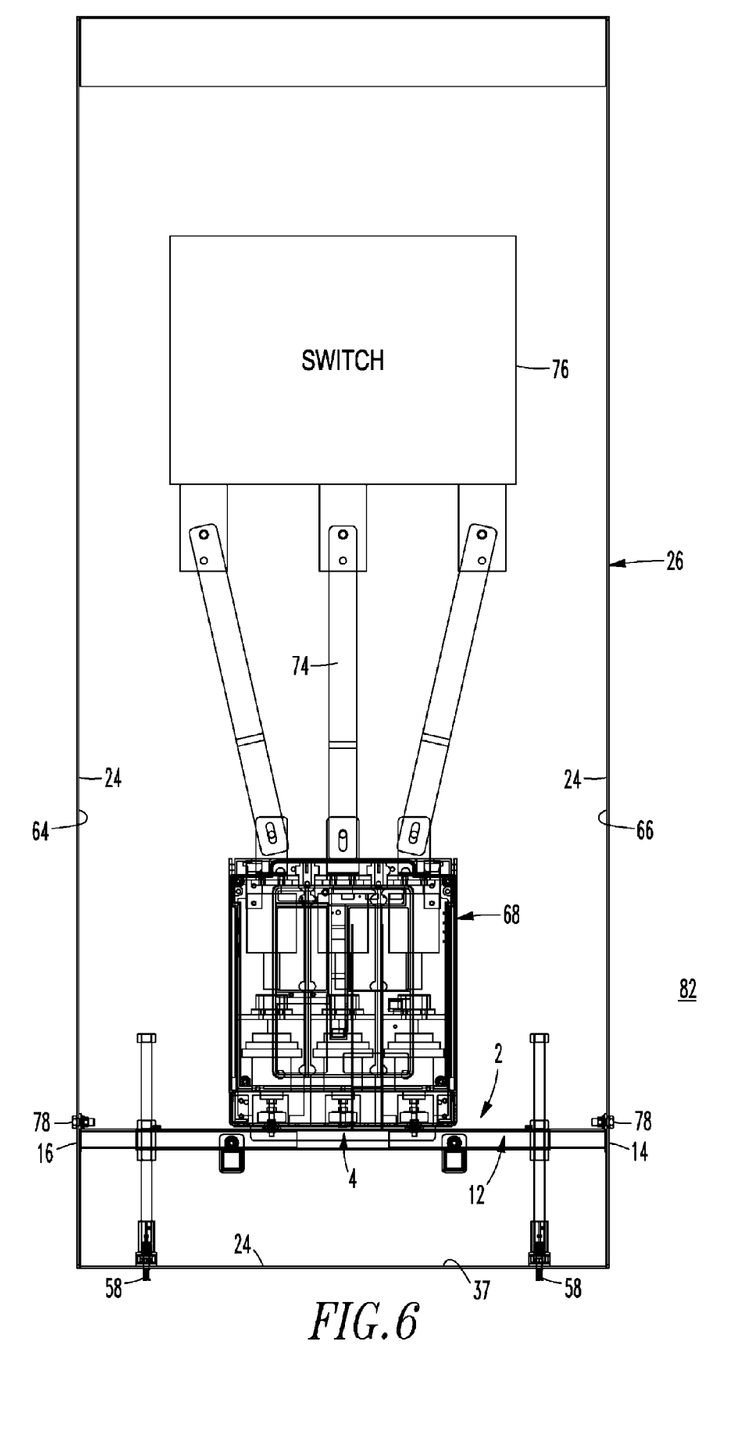
FIG. 6 is a vertical elevation view of a switchgear apparatus including a switchgear enclosure, a switch, an electrical switching apparatus and the electrical switching apparatus mounting apparatus of FIG. 1.

Both of the first end 14 and the opposite second end 16 of the first adjustable members 12 are structured to be adjustable toward or away from the base 4, and are structured to be coupled to two walls 24 of the switchgear enclosure 26 (as best shown in FIG. 6).

Example 2

Figure 7:
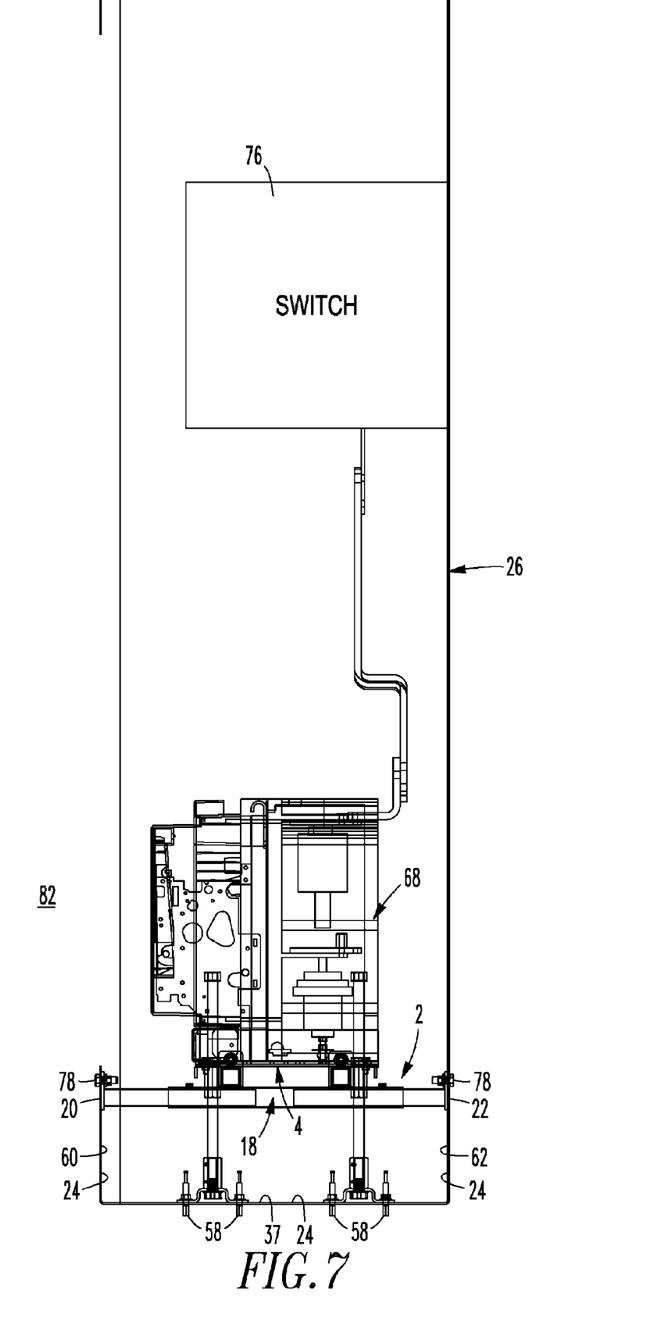
FIG. 7 is a side vertical elevation view of the switchgear apparatus of FIG. 6.

Both of the first end 20 and the opposite second end 22 of the second adjustable members 18 are structured to be adjustable generally toward or generally away from the base 4, and are structured to be coupled to two walls 24 of the switchgear enclosure 26 (as best shown in FIG. 7).

Example 3

As shown in FIGS. 1, 2, 4 and 5, a plurality of elongated members 28 are coupled transverse to the first adjustable members 12 and are disposed transverse to the second adjustable members 18. Each of the elongated members 28 includes a first end 30 and an opposite second end 32. For each of the elongated members 28, a corresponding adjustment member 34 couples a corresponding one of the elongated members 28 to a corresponding one of the first adjustable members 12 distal from the opposite second end 32 of the corresponding one of the elongated members 28. For each of the elongated members 28, a corresponding coupling mechanism 36 is coupled to the opposite second end 32 of the corresponding one of the elongated members 28. The corresponding coupling mechanism 36 is structured to couple the electrical switching apparatus mounting apparatus 2 to a wall 37 of the switchgear enclosure 26 (FIG. 7). The corresponding adjustment member 34 is structured to adjust the distance between the corresponding coupling mechanism 36 and a corresponding one of the first adjustable members 12.

Example 4

Figure 1:
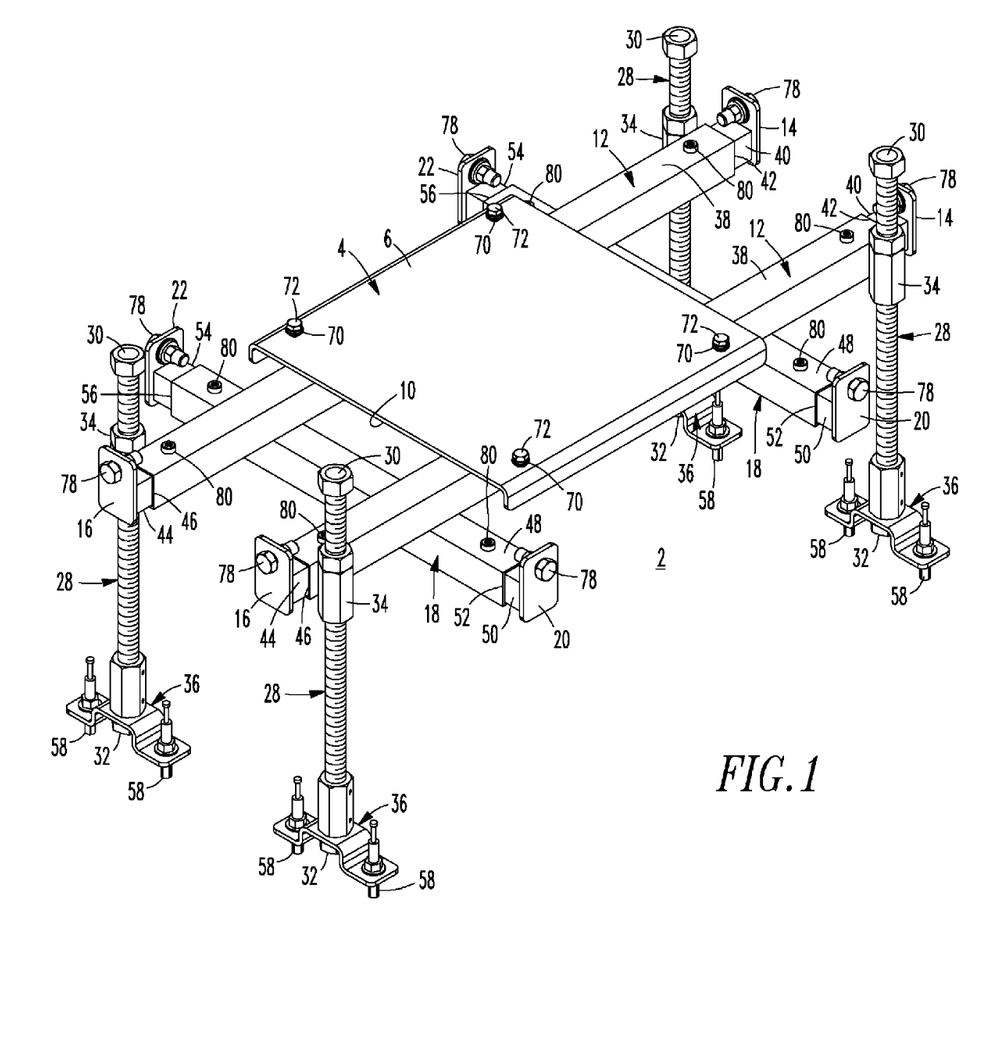
FIG. 1 is an isometric view of an electrical switching apparatus mounting apparatus in accordance with embodiments of the disclosed concept.
Figure 2:
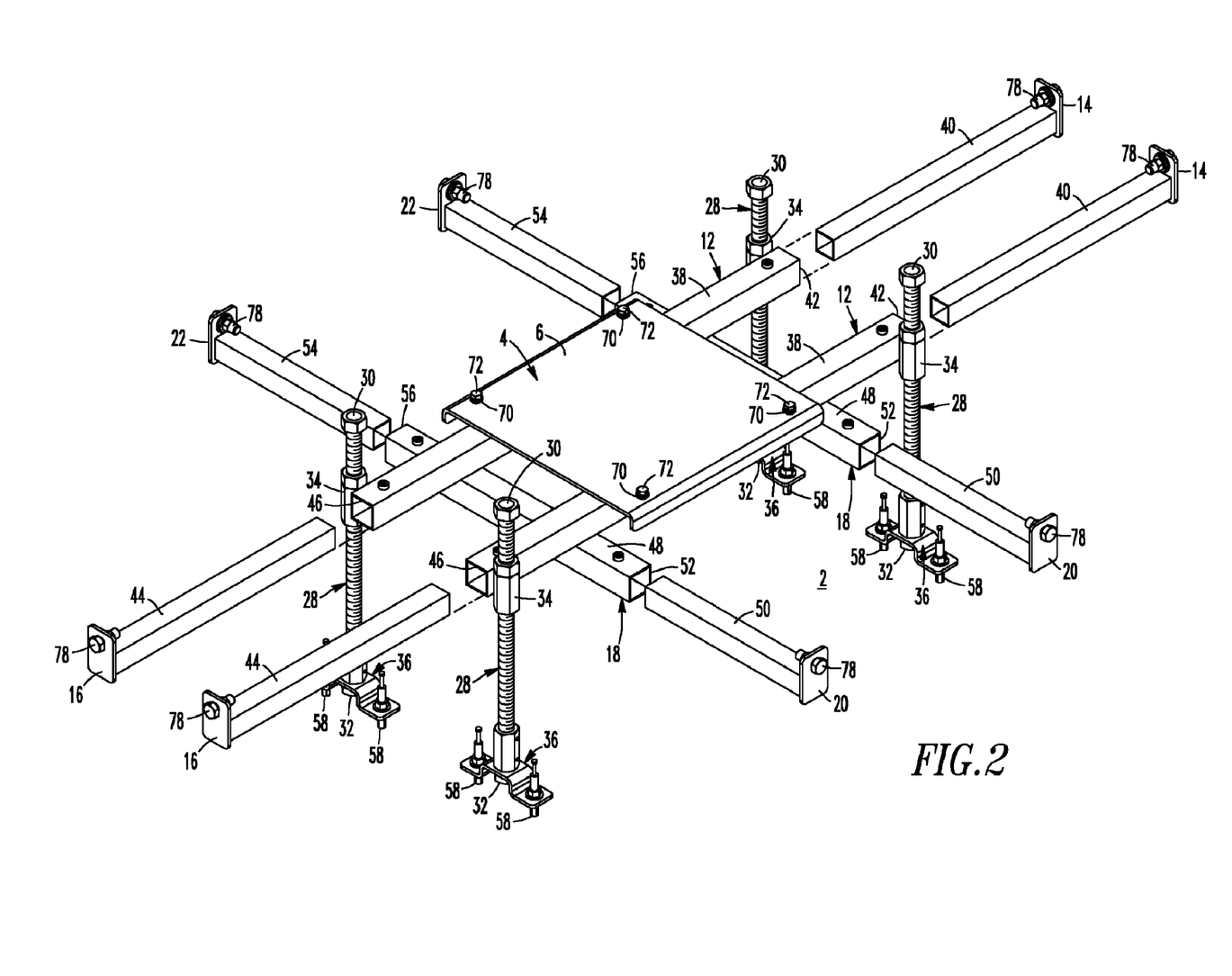
FIG. 2 is an exploded isometric view of the electrical switching apparatus mounting apparatus of FIG. 1.
Figure 3:
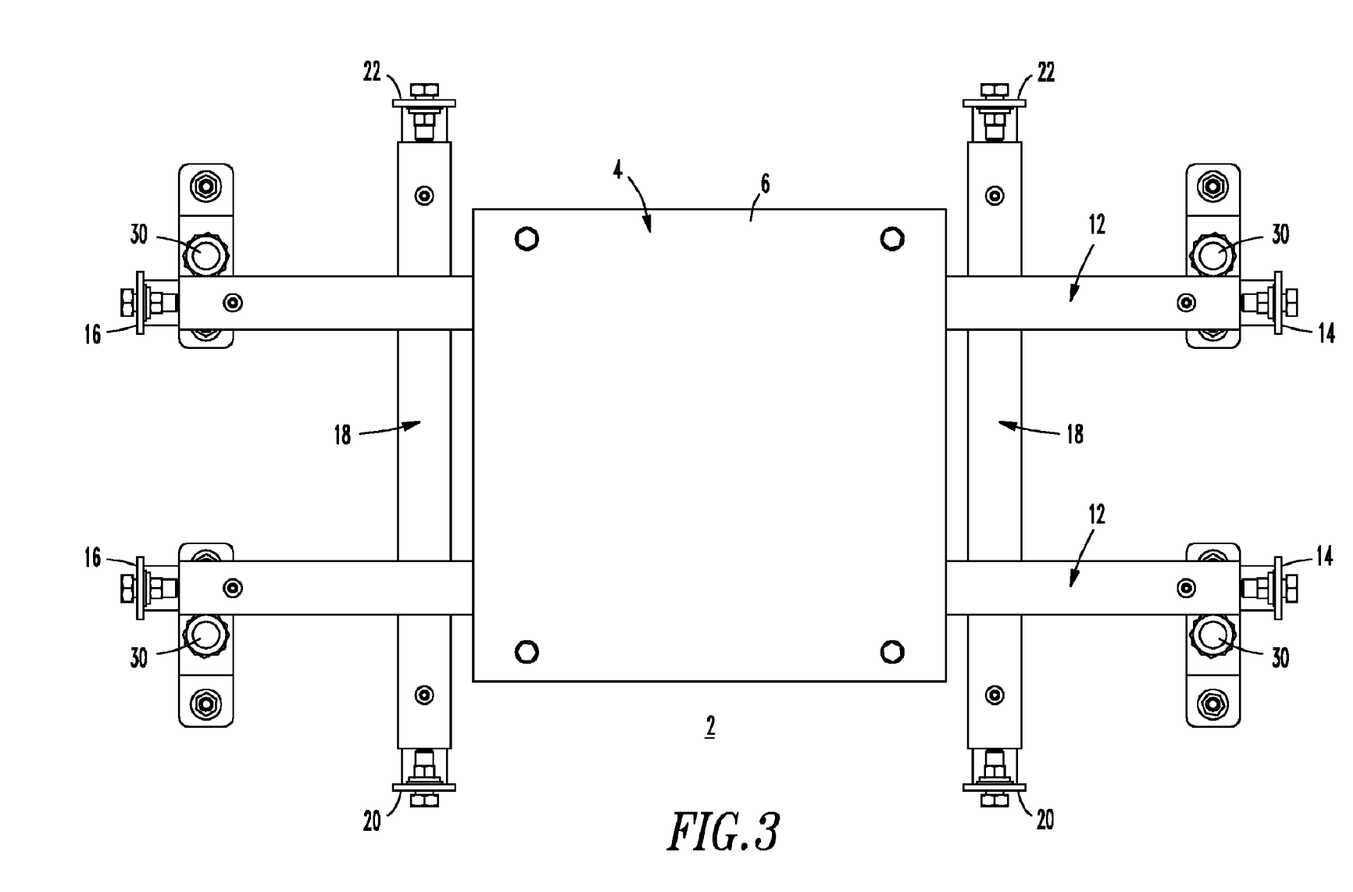
FIG. 3 is a top plan view of the electrical switching apparatus mounting apparatus of FIG. 1.
Figure 4:
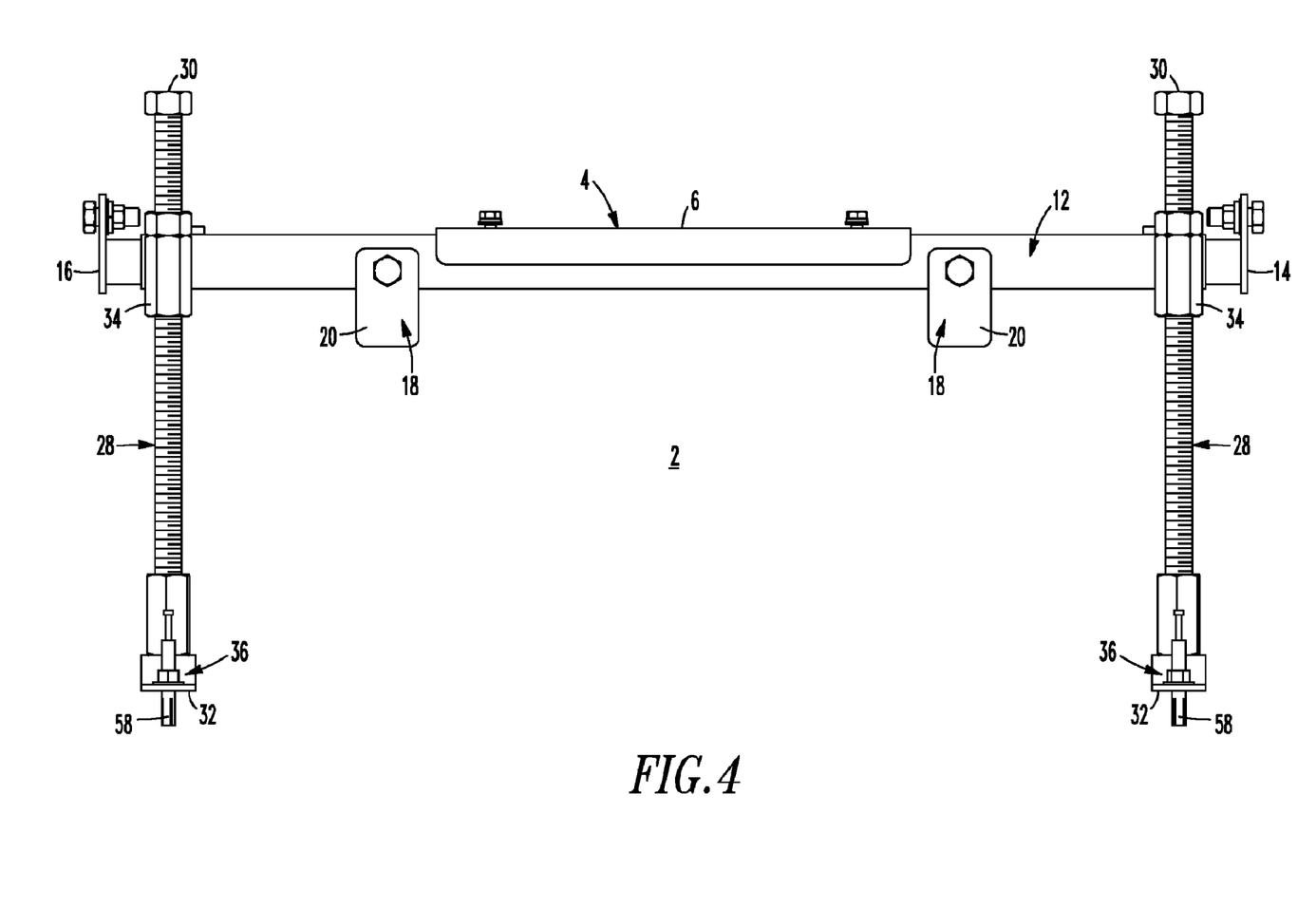
FIG. 4 is a side elevation view of the electrical switching apparatus mounting apparatus of FIG. 1.

As best shown in FIGS. 1 and 2, the example number of first adjustable members is two first adjustable members 12, the example number of second adjustable members is two second adjustable members 18, and the example plurality of elongated members is four elongated members 28. It will, however, be appreciated that any suitable number of first adjustable members 12, any suitable number of second adjustable members 18, and any suitable plurality of elongated members 28 can be employed.

Example 5

As best shown in FIGS. 1 and 2, each of the first adjustable members 12 includes a conduit member 38, a first slidable member 40 disposed within the conduit member 38 and slidable with respect to a first end 42 of the conduit member 38, and a second slidable member 44 disposed within the conduit member 38 and slidable with respect to the opposite second end 46 of the conduit member 38.

Example 6

As best shown in FIGS. 1 and 2, each of the second adjustable members 18 includes a conduit member 48, a first slidable member 50 disposed within the conduit member 48 and slidable with respect to a first end 52 of the conduit member 48, and a second slidable member 54 disposed within the conduit member 48 and slidable with respect to the opposite second end 56 of the conduit member 48.

Example 7

As best shown in FIGS. 1 and 2, each of the elongated members 28 is an elongated, threaded rod 28. The corresponding adjustment member 34 is a threaded coupling 34 coupling a corresponding elongated, threaded rod 28 to the corresponding one of the first adjustable members 12.

Example 8

For adjustment, the corresponding elongated, threaded rod 28 turns in the corresponding threaded coupling 34.

Example 9

A corresponding one of the coupling mechanisms 36 is coupled to the opposite second end 32 of the corresponding one of the elongated members 28. The coupling mechanism 36 includes a number of fasteners 58 structured to couple the opposite second end 32 of the corresponding one of the elongated members 28 to the wall 37 of the switchgear enclosure 26, as shown in FIGS. 6 and 7.

Example 10

At least one of the first end 14,20 and the opposite second end 16,22 of the first and second adjustable members 12,18 is structured to be fastened to the wall(s) 24 of the switchgear enclosure 26, as shown in FIGS. 6 and 7.

Example 11

As shown in FIGS. 6 and 7, the walls 24 of the switchgear enclosure 26 include a front side 60, a rear side 62, a left side 64, a right side 66, and the bottom side or wall 37.

Example 12

As shown in FIGS. 1 and 2, the example conduit member 38 is a fixed rectangular tube having a generally square opening at the ends 42,46. Each of the example first and second slidable members 40,44 is an expandable/slidable tube having a generally rectangular cross section (e.g., generally square), which is received within the generally square opening at the ends 42,46. Similarly, the example conduit member 48 is a fixed rectangular tube having a generally square opening at the ends 52,56. Each of the example first and second slidable members 50,54 is an expandable/slidable tube having a generally rectangular cross section (e.g., generally square), which is received within the generally square opening at the ends 52,56.

Example 13

The base 4 provides a fixed mounting plate for mounting an electrical switching apparatus, such as circuit interrupter 68 (FIGS. 6 and 7). The base 4 includes a plurality of openings 70 that receive a corresponding plurality of fasteners 72 (FIGS. 1 and 2). The fixed mounting plate 4 is coupled (e.g., without limitation, welded) to the upper surface of the two fixed rectangular tubes 38 (e.g., in the X direction), in order that the fixed mounting plate 4 is not adjustable. This allows the electrical switching apparatus to be stationary based upon its desired location within the switchgear enclosure 26 (FIGS. 6 and 7).

Example 14

The threaded couplings 34 can be threaded hex couplings coupled (e.g., without limitation, welded) to the outer side of the ends of the conduit members 38. The first end 30 of the elongated, threaded rods 28 can be a threaded hex nut coupled (e.g., without limitation, threaded and welded) onto the upper ends (with respect to FIGS. 1 and 2) of the threaded rods 28. Each of the elongated, threaded rods 28 is then screwed through a corresponding one of the four threaded hex couplings 34, which allows a corresponding one of the elongated, threaded rods 28 to be turned for suitable adjustment. The ends 14,16 and 20,22 of the respective slidable members 40,44 and 50,54 are surfaces that mount to the inside walls 24 of the switchgear enclosure 26 (FIGS. 6 and 7). The coupling mechanisms 36 are floor mounting plates that are coupled onto the lower ends (with respect to FIGS. 1 and 2) of the threaded rods 28. These coupling mechanisms 36 couple to the bottom side or wall 37 of the enclosure 26. The fasteners 58 can be, for example and without limitation, pin drive stud anchors.

Example 15

There are two fixed rectangular tubes 38 (e.g., in the X direction), which are coupled (e.g., without limitation, welded) to the bottom surface 10 (FIG. 5) of the fixed mounting plate 4. There are also two separate fixed rectangular tubes 48 (e.g., in the Y direction), which are coupled (e.g., without limitation, welded) to the bottom surface of the two tubes 38 (e.g., in the X direction). The front and rear slidable members 50,54 are encapsulated tubes that are slidable to, for example and without limitation, about double their length. The side slidable members 40,44 are encapsulated tubes that are also slidable to increase their length. The four tubes 40, 44, 50, 54 slide on all eight ends of the first and second adjustable members 12,18 in, for example, the X and Y directions. The example eight expandable/slidable tubes 40, 44, 50, 54 are horizontally adjusted for coupling (e.g., without limitation, bolting; fastening), in order to secure the mounting apparatus 2 to the switchgear enclosure 26 (FIGS. 6 and 7). This allows for relatively large adjustable dimension ranges.

Example 16

The height of the fixed mounting plate 4 is set, for example and without limitation, by turning the threaded rods 28 with threaded hex nuts 30 with a suitable tool, such as a wrench, until the desired height is accomplished. For example, a bulls eye level (not shown) is placed onto the center of the fixed mounting plate 4 and the threaded rods 28 with threaded hex nuts 30 are adjusted until the fixed mounting plate 4 is level at the desired height inside the switchgear enclosure 26 (FIGS. 6 and 7).

Example 17

For a switchgear enclosure (e.g., without limitation, 26, as shown in FIGS. 6 and 7), the mounting apparatus 2 is placed inside the switchgear enclosure 26 and is installed by following a suitable procedure when used along with a plumb bob (not shown), a bulls eye level (not shown) and a mounting template (not shown). For example, a template is used with the installation procedures to position the mounting apparatus 2 in the desired location inside an existing switchgear enclosure 26. The template is installed on the mounting apparatus 2 by aligning a plumb bob tip (not shown) with a cross hair (not shown) on the template, such that the mounting apparatus 2 will be located in the desired front to rear and side to side location. This allows the placement of the mounting apparatus 2 in the desired location inside the switchgear enclosure 26. The center of the fixed mounting plate 4 is preferably aligned with the center phase 74 of the switchgear enclosure electrical switching apparatus (e.g., without limitation, an isolating switch 76 in series with the circuit interrupter 68), is placed in the desired front to rear location (as best shown in FIG. 7), and is adjusted to the desired height (FIGS. 6 and 7). All of the example eight expandable/slidable tubes 40, 44, 50, 54 are slid out in all X or Y directions until the ends 14, 16, 20, 22 are all flush with the corresponding steel walls 24 of the switchgear enclosure 26. After drilling eight holes (not shown) using the hole locations on ends 14, 16, 20, 22, suitable fasteners 78 are employed to couple the eight tubes 40, 44, 50, 54 to the corresponding steel walls 24 of the switchgear enclosure 26. Then, eight socket set screws 80 (FIG. 1) are installed and set, in order to secure the eight expandable/slidable tubes 40, 44, 50, 54 to the four fixed rectangular tubes 38,48.

If the front side 60, rear side 62 (or vertical steel barrier), left side 64 and right side 66 of the switchgear enclosure 26 (FIGS. 6 and 7) are all available, then the mounting apparatus 2 is preferably fastened to the switchgear enclosure 26 using the above procedure.

Example 18

Alternatively, if none of the sides 60, 62, 64, 66 of the switchgear enclosure 26 (FIGS. 6 and 7) is available, then suitable floor mounting provisions are provided. For bolting to the floor or to the bottom side 37 of the switchgear enclosure 26, eight holes are drilled into the floor and/or the bottom side 37 using the holes located in the four floor mounting plates 36. After drilling, eight fasteners, such as pin drive stud anchors 58, are inserted into each hole for anchoring the mounting apparatus 2 to the floor and/or the bottom side 37 of the switchgear enclosure 26 (and/or to the underlying concrete (not shown), if available).

Example 19

The example mounting apparatus 2 provides provisions for mounting to one, two or all three of: (1) the sides 64,66 (FIG. 6) of the switchgear enclosure 26; (2) the front and rear sides 60,62 (FIG. 7) of the switchgear enclosure 26; and/or (3) the floor and/or the bottom side 37 (FIGS. 6 and 7) of the switchgear enclosure 26. The disclosed mounting apparatus 2 is fastened to the switchgear enclosure 26 and/or the floor using one, two or all three of the procedures of Examples 16-18.

Example 20

Each switchgear enclosure manufacturer has different electrical switching apparatus (e.g., without limitation, switch 76 (FIGS. 6 and 7)) height dimensions, widths and depths for enclosures, such as the switchgear enclosure 26. The electrical switching apparatus sits in the desired location with respect to the example switch 76 located in the switchgear enclosure 26 after the mounting procedure (e.g., Examples 16, 17, 18 and/or 19) has been accomplished.

Being able to adjust the mounting height of the electrical switching apparatus accommodates many of the different variety of height dimensions. Being able to expand/slide the eight horizontal expandable/slidable tubes 40, 44, 50, 54 accommodates a wide variety of width and depth dimensions. After the mounting apparatus 2 is coupled to the switchgear enclosure 26 at the desired location, the fixed electrical switching apparatus is mounted by fastening (e.g., without limitation, bolting) the fixed electrical switching apparatus to the fixed mounting plate 4, which is coupled (e.g., without limitation, welded) to the mounting apparatus 2, which supports the electrical switching apparatus.

Example 21

FIG. 6 shows a switchgear apparatus 82 including the switchgear enclosure 26 having the plurality of walls 24, the electrical switching apparatus 68 disposed in the enclosure 26, and the electrical switching apparatus mounting apparatus 2 disposed in the enclosure 26. The electrical switching apparatus 68 is mounted to the first side 8 (as best shown in FIG. 5) of the fixed base 4.

Example 22

As was discussed above in connection with Examples 17 and 19, at least one of the first ends 14,20 and the opposite second ends 16,22 of the number of first and second adjustable members 12,18 is coupled to a number of the walls 24 of the switchgear enclosure 26.

Example 23

As was discussed above in connection with Examples 17 and 19, the number of the walls 24 of the switchgear enclosure 26 can be two or four walls 64,66 (FIG. 6) and/or 60,62 (FIG. 7) of the switchgear enclosure 26. Both of the first ends 14 and/or 20 and the opposite second ends 16 and/or 22 of the number of first and second adjustable members 12,18 can be adjusted generally toward or generally away from the base 4, and can be coupled to the two or four corresponding walls 64,66 and/or 60,62 of the switchgear enclosure 26.

Example 24

As was discussed above in connection with Examples 16 and 19, in addition to or separate from Example 23, the height of the fixed mounting plate 4 within the switchgear enclosure 26 can advantageously be adjusted and suitably leveled using the adjustment members 34 and the elongated, threaded rods 28 with the threaded hex nuts 30.

Example 25

An electrical switching apparatus, such as a circuit breaker 68, can be positioned on the mounting apparatus 2 front to rear and/or side to side by sliding the four horizontal expandable/slidable tubes 40, 44, 50, 54 to the desired width (e.g., in the X direction) and/or the desired depth (e.g., in the Y direction), thereby accommodating a wide variety of widths and depths defined by pre-existing switchgear.

For example and without limitation, the example width range is from about 31.5 inches to about 57.0 inches, and the example depth range is about 17.5 inches to about 35.25 inches within the switchgear enclosure 26. It will be appreciated, however, that these width and depth ranges are examples, and that a wide range of different width and depth ranges can be employed.

Example 26

The disclosed mounting apparatus 2 offers ease of adding a fixed electrical switching apparatus 68 into a pre-existing switchgear enclosure 26 and being able to accommodate a wide variety of different manufacturers' dimensions. The disclosed mounting apparatus 2 provides adjustable electrical switching apparatus mounting that can mount an electrical switching apparatus into a wide variety of different switchgear enclosures from various different manufacturers. The mounting apparatus 2 provides ease of installation while adapting the electrical switching apparatus 68 into a pre-existing switchgear structure. This flexibility of mounting into a wide range of switchgear dimensions is provided by a vertical height adjustment with four vertical threaded rods 28 along with four side horizontal expandable/slidable tubes 40,44, and four front/rear horizontal expandable/slidable tubes 50,54. As a result, the mounting apparatus 2 is adjustable in any one, two or all of the X, Y and Z directions.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical switching apparatus mounting apparatus comprising:
    a base including a planar portion having a first side and an opposite second side;
    a number of first adjustable members coupled to the opposite second side of said base, each of said number of first adjustable members including a first end and an opposite second end; and
    a number of second adjustable members coupled transverse to said number of first adjustable members, each of said number of second adjustable members including a first end and an opposite second end,
    wherein at least one of the first end and the opposite second end of at least one of said number of first adjustable members and said number of second adjustable members is structured to be adjustable generally toward or generally away from said base, and
    wherein at least one of the first end and the opposite second end of said at least one of said number of first adjustable members and said number of second adjustable members is structured to be coupled to a number of walls of a switchgear enclosure.

2. The electrical switching apparatus mounting apparatus of claim 1 wherein both of the first end and the opposite second end of said number of first adjustable members are structured to be adjustable toward or away from said base, and are structured to be coupled to two walls of the number of walls of said switchgear enclosure.

3. The electrical switching apparatus mounting apparatus of claim 1 wherein both of the first end and the opposite second end of said number of second adjustable members are structured to be adjustable generally toward or generally away from said base, and are structured to be coupled to two walls of the number of walls of said switchgear enclosure.

4. The electrical switching apparatus mounting apparatus of claim 1 wherein a plurality of elongated members are coupled transverse to said number of first adjustable members and are disposed transverse to said number of second adjustable members, each of said plurality of elongated members including a first end and an opposite second end; wherein for each of said plurality of elongated members, a corresponding adjustment member couples a corresponding one of said plurality of elongated members to a corresponding one of said number of first adjustable members distal from the opposite second end of the corresponding one of said plurality of elongated members; wherein for each of said plurality of elongated members, a corresponding coupling mechanism is coupled to the opposite second end of the corresponding one of said plurality of elongated members, said corresponding coupling mechanism being structured to couple said electrical switching apparatus mounting apparatus to a wall of the number of walls of said switchgear enclosure; and wherein said corresponding adjustment member is structured to adjust the distance between said corresponding coupling mechanism and a corresponding one of said number of first adjustable members.

5. The electrical switching apparatus mounting apparatus of claim 4 wherein said number of first adjustable members is two first adjustable members; wherein said number of second adjustable members is two second adjustable members; and wherein said plurality of elongated members is four elongated members.

6. The electrical switching apparatus mounting apparatus of claim 2 wherein each of said number of first adjustable members comprises a conduit member, a first slidable member disposed within and slidable with respect to the first end of said conduit member, and a second slidable member disposed within and slidable with respect to the opposite second end of said conduit member.

7. The electrical switching apparatus mounting apparatus of claim 3 wherein each of said number of second adjustable members comprises a conduit member, a first slidable member disposed within and slidable with respect to the first end of said conduit member, and a second slidable member disposed within and slidable with respect to the opposite second end of said conduit member.

8. The electrical switching apparatus mounting apparatus of claim 4 wherein each of said plurality of elongated members is an elongated, threaded rod; and wherein said corresponding adjustment member is a threaded coupling coupling a corresponding elongated, threaded rod to the corresponding one of said number of first adjustable members.

9. The electrical switching apparatus mounting apparatus of claim 8 wherein the corresponding elongated, threaded rod turns in the threaded coupling.

10. The electrical switching apparatus mounting apparatus of claim 4 wherein said corresponding coupling mechanism is coupled to the opposite second end of the corresponding one of said plurality of elongated members; and wherein said corresponding coupling mechanism comprises a number of fasteners structured to couple the opposite second end of the corresponding one of said plurality of elongated members to the wall of the number of walls of said switchgear enclosure.

11. The electrical switching apparatus mounting apparatus of claim 4 wherein said at least one of the first end and the opposite second end of said at least one of said number of first adjustable members and said number of second adjustable members is structured to be fastened to the wall of the number of walls of said switchgear enclosure.

12. The electrical switching apparatus mounting apparatus of claim 11 wherein said switchgear enclosure includes a front side, a rear side, a left side, a right side and a bottom side; and wherein the wall of the number of walls of said switchgear enclosure is at least one of the front side, the rear side, the left side, the right side and the bottom side.

13. A switchgear apparatus comprising:
an enclosure comprising a plurality of walls;
an electrical switching apparatus disposed in said enclosure; and
an electrical switching apparatus mounting apparatus disposed in said enclosure, said electrical switching apparatus mounting apparatus comprising:
 a base including a planar portion having a first side and an opposite second side, said electrical switching apparatus being mounted to the first side of said base,
 a number of first adjustable members coupled to the opposite second side of said base, each of said number of first adjustable members including a first end and an opposite second end, and
 a number of second adjustable members coupled transverse to said number of first adjustable members, each of said number of second adjustable members including a first end and an opposite second end,
wherein at least one of the first end and the opposite second end of at least one of said number of first adjustable members and said number of second adjustable members is structured to be adjustable generally toward or generally away from said base, and
wherein at least one of the first end and the opposite second end of said at least one of said number of first adjustable members and said number of second adjustable members is coupled to a number of said plurality of walls of said enclosure.

14. The switchgear apparatus of claim 13 wherein said number of said plurality of walls of said enclosure is two walls of said plurality of walls of said enclosure; and wherein both of the first end and the opposite second end of said number of first adjustable members are adjustable toward or away from said base, and are coupled to said two walls of said plurality of walls of said enclosure.

15. The switchgear apparatus of claim 14 wherein said two walls of said plurality of walls of said enclosure are two opposing sides of said enclosure.

16. The switchgear apparatus of claim 13 wherein said number of said plurality of walls of said enclosure is two walls of said plurality of walls of said enclosure; and wherein both of the first end and the opposite second end of said number of second adjustable members are adjustable generally toward or generally away from said base, and are coupled to said two walls of said plurality of walls of said enclosure.

17. The switchgear apparatus of claim 16 wherein said two walls of said plurality of walls of said enclosure are two opposing sides of said enclosure.

18. The switchgear apparatus of claim 13 wherein a plurality of elongated members are coupled transverse to said number of first adjustable members and are disposed transverse to said number of second adjustable members, each of said plurality of elongated members including a first end and an opposite second end; wherein for each of said plurality of elongated members, a corresponding adjustment member couples a corresponding one of said plurality of elongated members to a corresponding one of said number of first adjustable members distal from the opposite second end of the corresponding one of said plurality of elongated members; wherein for each of said plurality of elongated members, a corresponding coupling mechanism is coupled to the opposite second end of the corresponding one of said plurality of elongated members, said corresponding coupling mechanism coupling said electrical switching apparatus mounting apparatus to one wall of said number of said plurality of walls of said enclosure; and wherein said corresponding adjustment member adjusts the distance between said corresponding coupling mechanism and a corresponding one of said number of first adjustable members.

19. The switchgear apparatus of claim 18 wherein the wall of said enclosure is the bottom side or floor of said enclosure.

20. The switchgear apparatus of claim 13 wherein said number of said plurality of walls of said enclosure are four walls of said plurality of walls of said enclosure; wherein said electrical switching apparatus is positioned on the first side of said base of said electrical switching apparatus mounting apparatus; wherein both of the first end and the opposite second end of said number of first adjustable members are adjustable toward or away from said base, and are coupled to two opposing walls of said four walls; and wherein both of the first end and the opposite second end of said number of second adjustable members are adjustable generally toward or generally away from said base, and are coupled to two different opposing walls of said four walls.

21. The switchgear apparatus of claim 20 wherein all of said number of first adjustable members and said number of second adjustable members are adjustable to provide a width range of about 31.5 inches to about 57.0 inches, and a depth range of about 17.5 inches to about 35.25 inches within said enclosure.

22. The switchgear apparatus of claim 13 wherein said electrical switching apparatus is a circuit interrupter.

* * * * *